United States Patent [19]

Pengo et al.

[11] 4,270,411
[45] Jun. 2, 1981

[54] WASHING MACHINE DRIVE ASSEMBLY

[75] Inventors: Giuseppe Pengo, Pordenone, Italy; Hans J. Schwerdhöfer, Schweinfurt, Fed. Rep. of Germany

[73] Assignees: Fichtel & Sachs AG, Schweinfurt, Fed. Rep. of Germany; S.O.L.E. Societa Opitergina Lavorazioni Elettroplastiche S.p.A., Oderzo, Italy

[21] Appl. No.: 30,857

[22] Filed: Apr. 17, 1979

[30] Foreign Application Priority Data

Apr. 20, 1978 [DE] Fed. Rep. of Germany ....... 2817349

[51] Int. Cl.³ .................... F16H 3/74; F16D 47/00
[52] U.S. Cl. ............................ 74/752 E; 192/48.3; 192/48.7; 192/105 CD
[58] Field of Search ............... 74/752 E; 310/42, 258, 310/256, 259, 217; 192/48.3, 48.7, 48.9, 45, 105 CD; 68/24, 140

[56] References Cited

U.S. PATENT DOCUMENTS

| | | | |
|---|---|---|---|
| 1,577,976 | 3/1926 | Knowlson et al. | 310/217 X |
| 3,254,545 | 6/1966 | Witte et al. | 74/752 E |
| 3,461,746 | 8/1969 | Schwerdhofer | 74/752 E |
| 3,662,622 | 5/1972 | Neumann | 74/752 E |

FOREIGN PATENT DOCUMENTS 2254745 5/1974 Fed. Rep. of Germany .

Primary Examiner—C. J. Husar
Assistant Examiner—Frank McKenzie
Attorney, Agent, or Firm—Toren, McGeady and Stanger

[57] ABSTRACT

A drive assembly particularly suited for washing machines includes a variable speed motor having a motor shaft rotatably supported in two motor housing flanges and a planetary gearing with a sun gear provided on the motor shaft and with a ring gear arranged on an adjacent motor housing flange. A carrier gear of the planetary gearing is separately rotatably supported on a hollow shaft coaxial with the motor shaft and rotatably supported thereon with the hollow shaft being coupled in fixed driving engagement with a driven member of the assembly. The driven member may be driven for high speed operation directly by the motor shaft through a centrifugal friction clutch operatively coupled therebetween. Low speed drive occurs from the motor shaft through the planetary gearing, the overrunning clutch and the hollow shaft and when a certain minimum speed is reached the centrifugal clutch engages causing the driven member to drive the hollow shaft and thereby effect disengagement of the overrunning clutch.

19 Claims, 3 Drawing Figures

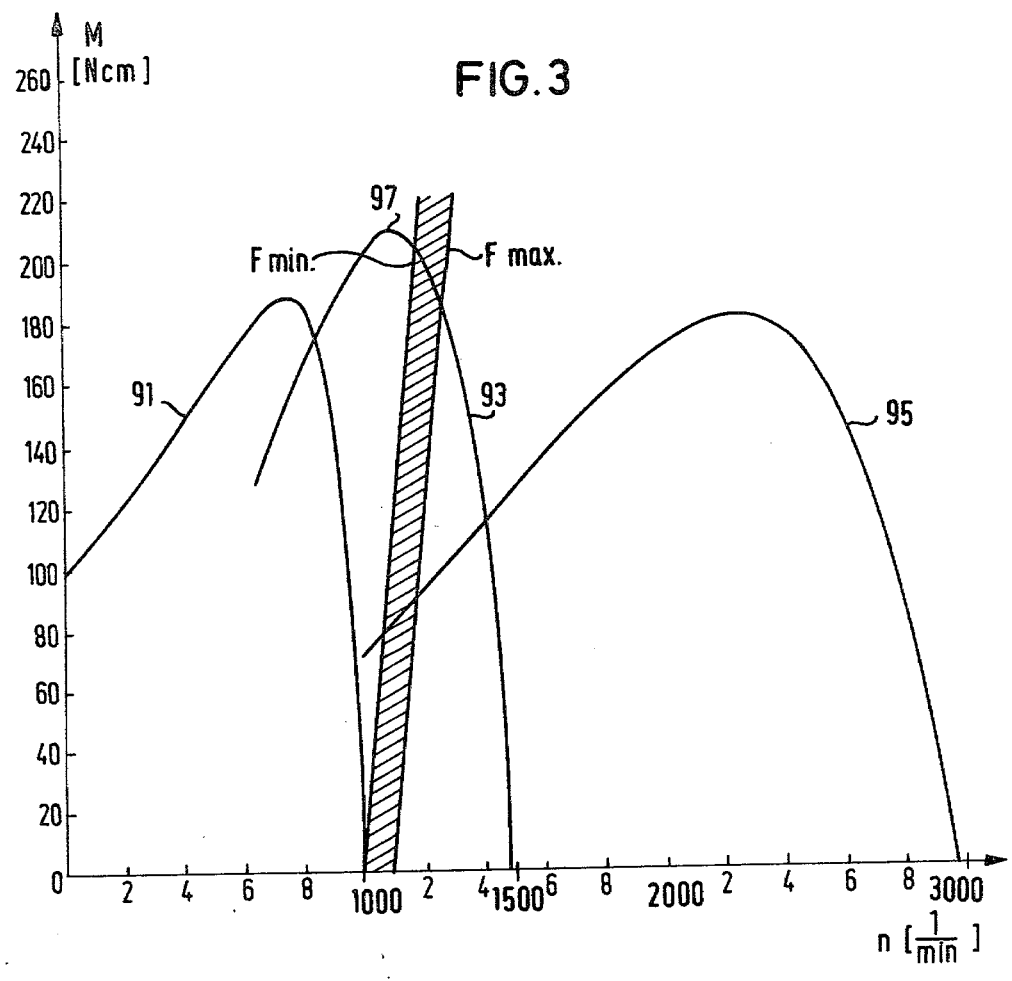

WASHING MACHINE DRIVE ASSEMBLY

BACKGROUND OF THE INVENTION

The present invention relates generally to electric motor drive mechanisms and more particularly to the structure and arrangement of a motor drive unit particularly suitable for washing machines. More specifically, the invention relates to a drive assembly utilizing an electric motor wound to effect operation with a differing number of poles with the driven member of the assembly being driven at high speed operation through a centrifugal frictional clutch directly engaging between the driven member and the motor shaft or at low speed operation through planetary gearing driven by the motor shaft and connected to transmit power to the driven member through an overrunning clutch and a hollow shaft rotatably fixedly engaged on the driven member, with the overrunning clutch disengaging when the hollow shaft exceeds a predetermined speed as a result of driving engagement of the driven member with the motor shaft through the centrifugal frictional clutch.

A drive for washing machines of the type to which the present invention relates is known from German Offenlegungsschrift No. 22 54 745. In this known drive arrangement, the motor shaft is supported on both sides of the motor armature immediately in a roller bearing in each motor housing flange. A one-piece motor shaft projects beyond one of the motor housing flanges to an extent such that a planetary gearing, an overruning clutch, a driven member which is usually constructed as a belt pulley and a centrifugal frictional clutch can be accommodated in the axial direction of the assembly adjacent each other on the motor shaft. Accordingly, the motor shaft must be dimensioned with sufficient thickness so that radial forces occurring at the driven member can be absorbed by the motor shaft to accommodate for its relatively long unsupported length. Moreover, the large diameter of the motor shaft necessitates large dimensions for the bearings and the planetary gearing thereby increasing all of the dimensions of the washing machine drive unit to an undesirable degree thereby increasing the expense of the washing machine drive.

Accordingly, the present invention is directed toward the task of providing techniques whereby the dimensions of the drive unit of a washing machine of the type in question may be reduced. More particularly, the invention seeks to reduce the dimensions of the motor drive shaft of the drive unit while at the same time providing a unit which is simple to assemble and wherein the centering of the planetary gearing is especially relatively simple to accomplish.

SUMMARY OF THE INVENTION

Briefly, the present invention may be described as a washing machine drive assembly comprising a variable speed electric motor having a motor shaft, a hollow shaft coaxial with the motor shaft and rotatably supported thereon, planetary gearing drivingly coupled with the motor shaft, a driven member drivingly connected in fixed engagement with the hollow shaft, and clutch means for selectively drivingly engaging the motor shaft with the driven member directly through a centrifugal frictional clutch or through the planetary gear means and the hollow shaft by means of an overrunning clutch arranged in engagement between the planetary gearing and the hollow shaft. The centrifgual clutch means operatively interposed between the motor shaft and the driven member is arranged to engage when a certain predetermined speed is exceeded. As a result, the driven member will drive the hollow shaft which will cause the overrunning clutch to disengage when the unit is switched from low-speed drive to high-speed drive.

A motor housing for the electric motor includes a motor housing flange located adjacent the planetary gearing and constructed as a gearing housing for the planetary gearing, the motor shaft being supported through the hollow shaft on that part of the motor housing flange which forms the gearing housing.

Thus, the device of the present invention provides advantageous results in that the motor housing flange which is adjacent the planetary gearing is constructed as a gearing housing with the motor shaft being supported through the hollow shaft by that portion of the motor housing flange which forms the gearing housing.

The planetary gearing and the overrunning clutch are arranged within a common motor and gearing housing, i.e. between the two motor housing flanges and only the driven member and the centrifugal friction clutch are arranged outside of the motor housing. The bearings which support the hollow shaft can be moved very close to the driven member and they may preferably be arranged immediately adjacent the driven member so that the unsupported length of the motor shaft and of the hollow shaft arranged thereon may be maintained to minimum dimensions.

As a result, the diameters of the motor shaft and of the hollow shaft and, thus, the dimensions of the planetary gearing can be significantly reduced. Since the planetary gearing is arranged between the motor housing flanges, the space on the interior of the motor housing which would otherwise remain unutilized may be utilized for reducing the overall dimensions of the unit.

It is additionally known to connect the control gearing with a separate driven shaft to an electric motor whose motor shaft is supported in motor flanges which are arranged on both sides of an armature. The driven shaft is coupled to the motor shaft through a coupling piece which may be axially inserted. The control gearing comprises a planetary gearing having a sun gear provided on the driven shaft of the gearing and having a ring or internal gear arranged on the motor housing flange. The carrier gear of the planetary gearing is supported on a hollow shaft which is coaxially and rotatably mounted on the driven shaft and which can be coupled to the hollow shaft through an overrunning clutch, in a manner similar to the gearing known from German Offenlegungsschrift No. 22 54 745. The driven member is non-rotatably mounted on the hollow shaft, the driven member supporting a clutch drum of a centrifugal friction clutch whose driving member is mounted on the driven shaft. The hollow shaft is supported between the carrier gear and the driven member on the gearing housing which is releasably connected to the motor flange.

However, this washing machine drive is not a mechanism of the type described in detail hereinabove wherein the one-piece motor shaft simultaneously forms the driven shaft of the gearing. The gearing is subsequently connected to the motor which is already assembled to a unit which is ready for operation. To avoid alignment errors between the motor shaft and the driven shaft of the gearing, the gearing housing must be adjusted relative to the motor flange which carries the ring gear. This means that the assembly is more cumbersome. Three bearings are provided for supporting the motor shaft and the hollow shaft on the motor housing flanges and the gearing housing.

In accordance with a better, preferred embodiment of the invention, it is provided that the driven side of the motor shaft is exclusively supported in the hollow shaft or in a part which is, on the one hand, non-rotatably connected to the hollow shaft and which is, on the other hand, connected in a bearing of that motor housing flange which is located opposite the driven side. Preferred embodiments are those in which the motor shaft is supported on both sides of the motor housing flange on the driven side by the hollow shaft or by a part which is non-rotatably mounted on the hollow shaft. The bearing which is located adjacent the carrier gear and in which the hollow shaft is mounted on the motor shaft is advantageously constructed as a friction bearing since bearings of this type have a relatively small radial space requirement. Especially suitable are those friction bearings which have a sliding sleeve of plastic material. A roller bearing is preferably used for the bearing in which the motor shaft is supported on the side which is located outside of the motor housing. The driving part of the centrifgual friction clutch is preferably mounted on the motor shaft on that side of the driven member which axially faces away from the motor housing flange. Accordingly, the roller bearing is arranged between the driven member and the driving part and it will center the clutch drum supported on the driven member relative to the driving part without problems even in the case of a radial drive load on the driven member.

Since the planetary gearing and the overrunning clutch are arranged within the motor housing, an annular cover is preferably arranged on the inner side of the motor housing flange forming the gearing housing which encloses the planetary gearing which is located between the annular cover and the motor housing flange. The motor shaft is passed through the opening of the annular cover, and the annular cover may be made of thin sheet metal material since it does not need to support the motor shaft. Additionally, the annular cover will also fix the ring or internal gear of the planetary gearing in the axial direction.

The shifting operation of the centrifugal friction clutch is effected by switching the number of pairs of poles of the electric motor which is constructed as an asynchronous motor which includes windings capable of being selectively connected. The number of poles selected for motor operation determines the nominal speed of rotation of the motor shaft. The electric motor may be constructed as a four-pole/two-pole motor. In such case, the centrifugal friction clutch would be dimensioned in such a way that the clutch begins to engage at a rate of speed above the synchronous speed of rotation of the four-pole operation in order thereby to safely exclude disengagement of the reduction gearing during slower speed of rotation of the four-pole operation. The reduction gearing should only be disengaged during high speed rotation of the two-pole spinning operation of a washing machine. Since the clutch utilized is a centrifugal friction clutch which will not engage suddenly, the torque transmission through the gearing may be terminated in accordance with the increasing speed of rotation during acceleration which occurs when the rotational speed to effect spinning is increased by two-pole operation of the motor. The torque transmission through the gearing reduces the initial torque which must be applied during two-pole operation and thus the motor may be designed with lower power requirements.

However, in a preferred embodiment it is provided that the electric motor, which is constructed as an asynchronous motor with windings which may be selectively connected, can be switched between at least three numbers of pairs of poles and that the centrifugal friction clutch begins to grip at a rotational speed above the synchronous speed of the highest number of pole pairs and engages at a rotational speed which is equal to or higher than the speed corresponding to the pull-out torque of the second highest number of pole pairs, but which is lower than the synchronous rate of speed of the next-to-highest number of pole pairs. The centrifugal friction clutch is advantageously engaged slightly above the rotational speed corresponding to the pull-out torque of the next-to-highest number of poles. The electric motor can preferably be of the type which may be switched between operation with six, four and two pairs of poles or with eight, four and two pairs of poles. When the machine is to effect washing operation with the planetary gearing engaged, the number of pole pairs selected or utilized will be six or eight. Since the speed of rotation of the rotor shaft in the case of pole pairs of this number is relatively low, the planetary gearing must only be designed for a relatively small reduction ratio and it will thereby require relatively little space.

The next-to-highest number of pole pairs is switched into operation during the spin cycle, which may have two rotational speeds, one lower than the other. The centrifugal friction clutch engages in order to discontinue torque transmission through the planetary gearing again in dependence upon the increasing speed of rotation so that in this embodiment as well the motor may be dimensioned for lower drive power. The lowest number of pole pairs is switched into operation during high speed spinning. It has been found that motors which are designed for a lower driving power for operation with the next-to-highest number of pole pairs, i.e. four-pole operation, will have a motor speed-torque characteristic during operation with the lowest number of pole pairs (two-pole operation) which is adequate and sufficient for operation at a higher rate of rotation for spinning.

In a preferred embodiment, it is provided that the centrifugal friction clutch include certain centrifugal weights for engagement with the clutch drum which are arranged at a given distance from the axis of rotation of the driving part in joints on the driving part in such a manner that they pivot radially outwardly due to the centrifugal force applied against the action of the springs. Each joint is arranged in the direction of rotation of the motor shaft behind the center of gravity of the centrifugal weight supported in the joint. The centrifugal weights of such a centrifugal friction clutch run against the clutch drum.

The motor housing flanges may reach to the stator laminations and may be pressed together and against the stator laminations by means of spacer bolts or the like which extend through both motor housing flanges in the direction of the motor shaft. However, it has been found advantageous to select those embodiments in which the motor housing flanges are placed on the axial end opening of a cylindrical tube from whose wall tongues are punched for fastening the stator laminations and which are bent toward the interior of the tube. The tongues extend past the stator laminations and fix them in the axial direction. The tongues are preferably bent from the plane of the wall toward the tube interior about a bending line which extends in the circumferential direction of the tube.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

DESCRIPTION OF THE DRAWINGS

In the drawings:

FIG. 3 is a graphical representation of the speed-torque characteristic of a washing machine drive utilizing a 6/4/2 pole-switching electric motor.

DETAILED DESCRIPTION OF THE PREFERRED EMBODIMENT

Figure 1:
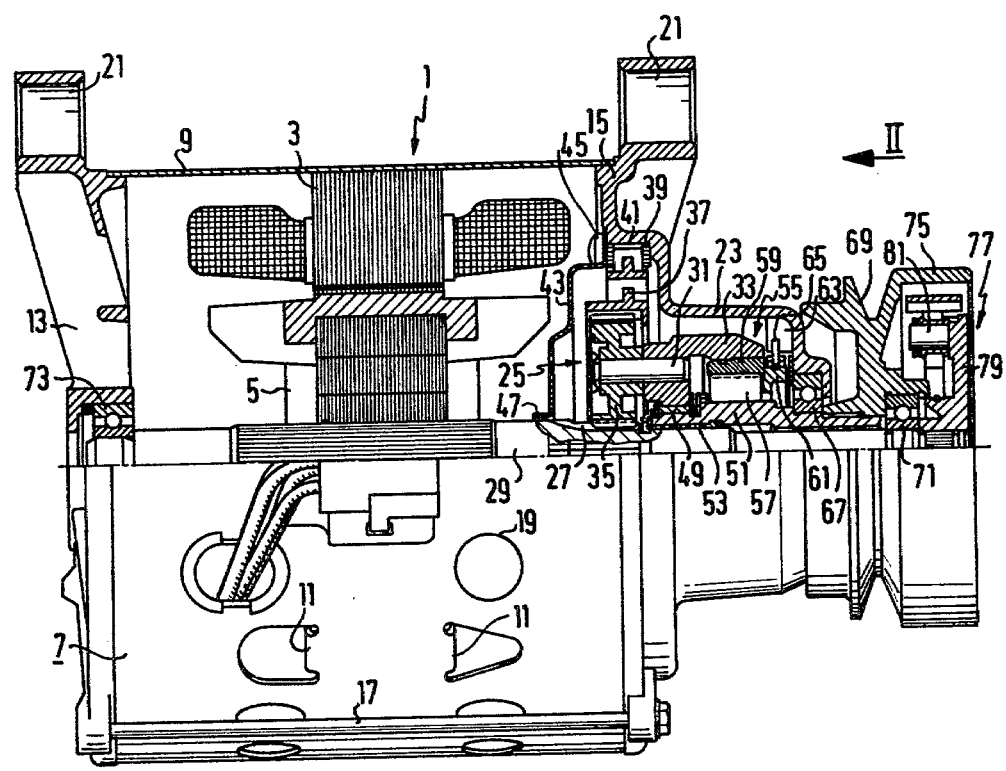
FIG. 1 is a partial axial sectional view taken through a preferred embodiment of a washing machine drive in accordance with the invention.

In FIG. 1 there is shown the preferred embodiment of a drive unit in accordance with the present invention as applied to a household washing machine, the drive unit including an asynchronous electric motor 1 having a pole-changing capacity whereby the motor may operate either as a six-pole, four-pole or two-pole motor. The motor 1 includes a stator 3 and an armature 5 which are surrounded by and enclosed within a housing 7. The housing 7 consists of a cylindrical tubular member 9 within which the stator 3 is axially fixed by means of tongues 11 which are punched from the wall of the tube 9 and which are bent inwardly along peripheral lines of the tube 9.

The axial end openings of the housing 7 are closed by housing flanges 13 and 15, the enclosure providing for the possible necessity of openings for ventilation. The housing flanges 13 and 15 are pressed against the end faces of the tube 9 and held in assembled position by means of spacer bolts 17. Additional holes 19 are provided for ventilation in the tube 9. Eyes 21 are cast into the housing flanges 13, 15 for mounting or fastening of the motor unit in position for operation.

An axially outwardly projecting cylindrical gearing housing 23 for housing a planetary gearing 25 is formed as part of the housing flange 15. The planetary gearing 25 includes a sun gear 27 which is cut or formed into a motor shaft 29 of the motor 1 which carries the armature 5. The planetary gearing 25 includes a plurality of planetary gears 35 rotatably supported on axles 31 of a carrier gear 33, with one only of the planetary gears 35 being shown in section. The planetary gears 35 mesh with the sun gear 27 and with an internal or ring gear 37 which is non-rotatably supported by means of elastic support elements 39 in a cylindrical groove 41 of the housing flange 15. An annular cover 43 which is formed as a stamped sheet metal member, or which may possibly be a molded plastic member, is screwed onto the housing flange 15 by means of screws 45 in order to close off the interior of the gearing housing 23 on the side thereof adjacent the motor 1. The motor shaft 29 extend through a concentric opening 47 in the annular cover 43 without being supported on the annular cover 43. The annular cover 43 fixes the support elements 39 and thus, the ring gear 37, in the axial direction. The carrier gear 33 is rotatably supported by means of a sintered bushing 49 on a hollow shaft 51 which is, in turn, rotatably supported on the motor shaft 29 by means of a slide bushing 53 made of plastic material which is placed within the sintered bushing 49.

The carrier gear 33 may be coupled to the hollow shaft 51 through an overrunning clutch 55. The overrunning clutch 55 includes grip rollers 57 which rotate together with the carrier gear 33 in recesses of a ring 59 which is non-rotatably connected to the carrier gear 33. The grip rollers 57 are guided in a cage 61 which is decelerated by means of a friction spring 65 which is guided around the outer circumference of the cage and which is supported on a projection 63 of the housing flange 15. The cage 61 decelerated by the friction spring 65 moves the grip rollers 57, when the carrier gear 33 is driven, into a clamped position in which they couple the carrier gear 33 with the hollow shaft 51. On the other hand, when the hollow shaft 51 is driven, it will freely rotate without driving the carrier gear 33.

The hollow shaft 51 extends through the housing flange 15 and is supported in the gearing housing 23 at the housing flange 15 in a deep groove roller bearing 67. A belt pulley 69 which is the driven member of the drive unit, is rigidly mounted on the hollow shaft 51 on that side of the housing flange 15 which faces away from the planetary gearing 25 immediately adjacent the deep groove roller bearing 67. The motor shaft 29 which axially projects beyond the hollow shaft 51 is supported in the belt pulley 69 by means of a deep groove roller bearing 71. On the side of the housing flange 15, the motor shaft 29 is supported on the housing flange 15 through the hollow shaft 51 which is supported on the housing flange 15 between the overrunning clutch 55 and the belt pulley 69. On the opposite side, the motor shaft 29 is directly supported in the housing flange 13 by means of a deep groove roller bearing 73.

Figure 2:
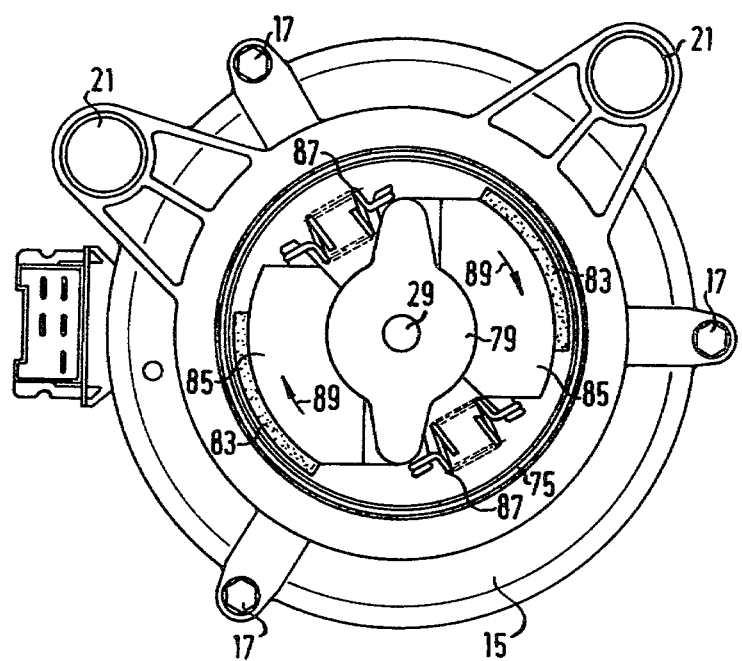
FIG. 2 is a frontal view of the washing machine drive according to FIG. 1 taken in the direction of the arrow II.

On the side of the belt pulley 69 facing away from the housing flange 15, the pulley 69 carries a clutch drum 75 of a centrifugal friction clutch 77 having a driving part 79 which is rigidly mounted on the motor shaft 29. As is best seen in FIG. 2, centrifugal weights 85 which are provided with friction linings 83 are pivotally connected to journals 81 of the driving member 79, the centrifugal weights 85 being pretensioned inwardly by means of springs 87. The journals 81 are staggered in the circumferential direction relative to the centers of gravity of the centrifugal weights 85. The motor shaft 29 is driven in the direction of the arrows 89 and as a result the journals 81 follow the centrifugal weights in the direction of rotation and the centrifugal weights 85 are pressed against the clutch drum 75.

The stator winding of the drive unit may be switched to effect either six-pole, four-pole or two-pole operation of the motor. The speed-torque characteristics for torque at a driven side M which is available at the motor shaft 29 are illustrated in FIG. 3 relative to the rate of rotation n for the different numbers of pole pairs indicated. The characteristic for six-pole operation is denoted by the curve 91, the characteristic for four-pole operation is denoted by the curve 93 and the characteristic for two-pole operation is denoted by the curve 95. The maximum rate of rotation for each of these characteristic curves 91, 93 and 95 is achieved at the synchronous rate of rotation of the respective numbers of pole pairs. The nominal rate of rotation is slightly below the synchronous rotation rate. The spring characteristics of the centrifugal friction clutch 77 are selected in such a way that the centrifugal friction clutch 77 will begin to engage above the synchronous rate of rotation of the six-pole operation phase and will be engaged at the rate of rotation at or above the rate of rotation corresponding to the pull-out point 97 of the four-pole winding. FIG. 3 shows the clutch operation range of the centrifugal friction clutch 77 between a minimum spring constant $F_{min}$ and a maximum spring constant of $F_{max}$.

Accordingly, the centrifugal friction clutch 77 is always disengaged when the six-pole winding is switched in and will be always engaged when the four-pole or the two-pole winding is excited. The six-pole winding is at least a two-phase winding so that the motor will be able to start-up by itself. If the four-pole or the two-pole windings are capable of always being connected during the six-pole operation, these windings may possibly also be single-phase windings.

The motor 1 is switched to operate as a six-pole winding motor when the washing machine is to perform a washing operation. The four-pole winding operation is switched on for performance of the spinning cycle at a lower spin-cycle speed (half speed) and two-pole winding operation is excited for the spin cycle at the high rate of rotation.

In the details of the operation of the washing machine drive, when the six-pole winding is actuated for the washing cycle, the rotating stator field drives the armature 5 and the motor shaft 29 rotates at a rate of speed which is below the synchronous rate of rotation of the six-pole operation during which the centrifugal friction clutch 77 is disengaged. Torque is transmitted to the belt pulley 69 through the sun gear 27, the planet gear 35, the carrier gear 33, the overrunning clutch 55 and the hollow shaft 51. Thus, during washing cycle operation, the motor shaft 29 is connected with the driven member 69 through the planetary gearing 25, the overrunning clutch 55 and the hollow shaft 51.

When it is desired to effect the lower speed spin cycle, the four-pole winding operation is actuated and the rate of rotation of the motor shaft 29 increases above the synchronous rate of rotation for the six-pole operation. As a result, the centrifugal clutch 77 begins to engage and it will finally be completely engaged with increasing rotational speed. During the engaging procedure of the clutch 77, the belt pulley will be simultaneously driven through the planetary gearing 25, the overrunning clutch 55 and the hollow shaft 51 as well as through the centrifugal friction clutch 77. This double-drive enables use of an electric motor 1 having lowered power requirements for the four-pole mode of operation. When the centrifugal friction clutch 77 is fully engaged, the hollow shaft 51 will be driven by the driven member or belt pulley 69 and thereby caused to rotate at a speed higher than the speed of the carrier gear 33 of the planetary gearing 25, whereby the drive connection between the carrier gear 33 and the hollow shaft 51 is disengaged by disengagement of the overrunning clutch 55.

When it is desired to effect spin-cycle operation at the higher rate of rotational speed, the four-pole winding is de-energized and the two-pole winding is energized whereby the driven member 69 would be driven by the motor shaft 29 directly through the centrifugal friction clutch 77.

Of course, it should be understood that an eight-pole winding operation may be utilized instead of the six-pole winding operation for the wash cycle.

While a specific embodiment of the invention has been shown and described in detail to illustrate the application of the inventive principles, it will be understood that the invention may be embodied otherwise without departing from such principles.

What is claimed is:

1. A washing machine drive mechanism comprising: a variable speed electric motor including a motor shaft; a hollow shaft coaxial with said motor shaft and rotatably supported relative thereto; planetary gearing located adjacent said electric motor and including a sun gear affixed with said motor shaft and a carrier gear rotatably supported on said hollow shaft; a driven member drivingly connected with said hollow shaft; clutch means for selectively drivingly engaging said motor shaft with said driven member directly as well as through said planetary gearing and said hollow shaft, said clutch means including centrifugal friction clutch means operatively interposed between said motor shaft and said driven member to effect said direct drive therebetween and overrunning clutch means to effect driving of said driven member by said motor shaft through said planetary gearing and said hollow shaft; a motor housing for said electric motor including motor housing flange means extending from said motor housing and enclosing said planetary gearing, said motor housing flange means being constructed as a gearing housing for said planetary gearing and for said overrunning clutch means; and bearing means for supporting said motor shaft through said hollow shaft on said motor housing flange, said motor shaft being supported on one side thereof exclusively by said hollow shaft on that part of said motor housing flange means which forms said gearing housing.

2. A mechanism according to claim 1 wherein said motor shaft is supported on both sides of said motor housing flange means by said bearing means on said hollow shaft.

3. A mechanism according to claim 1 wherein said motor shaft is arranged in supportive engagement with said driven member which is non-rotatably mounted on said hollow shaft.

4. A mechanism according to claim 2 wherein said bearing means includes a bearing located adjacent said carrier gear and constructed as a friction bearing.

5. A mechanism according to claim 4 wherein said friction bearing includes a slide bushing of plastic material.

6. A mechanism according to claim 2 wherein said centrifugal friction clutch means includes a driving part thereof mounted on said motor shaft on that side of said driven member facing axially away from said motor housing flange means and wherein said motor shaft is supported on said driven member by means of a roller bearing.

7. A mechanism according to claim 2 wherein said motor housing flange means is located immediately adjacent said driven member.

8. A mechanism according to claim 1 wherein an annular cover is arranged on the inside of said motor housing flange means located adjacent said planetary gearing, said annular cover enclosing said planetary gearing with said planetary gearing being arranged between said annular cover and said motor housing flange means, said motor shaft passing through an opening formed in said annular cover.

9. A mechanism according to claim 8 wherein said planetary gearing includes a ring gear and wherein said annular cover is arranged with said ring gear of said planetary gearing affixed thereto in the axial direction.

10. A mechanism according to claim 1 wherein said electric motor is an asynchronous motor having selectively connectable windings to provide motor operation with at least three separate numbers of pole pairs and wherein said centrifugal friction clutch means is designed to commence engagement at a speed of rotation which is above the synchronous speed of rotation of the highest number of pole pairs with which said electric motor operates, said friction clutch means being engaged at a rotational speed equal to or larger than the rotational speed corresponding to the pull-out torque of the next-to-highest number of pole pairs of said electric motor but which is smaller than the synchronous rotational speed of the next-to-highest number of pole pairs.

11. A mechanism according to claim 10 wherein said centrifugal friction clutch means is engaged at a rotational speed which is slightly above the speed corresponding to the pull-out torque of the next-to-highest number of pole pairs.

12. A mechanism according to claim 10 wherein said electric motor is adapted to be switched for operation individually with each of six, four and two pole pairs.

13. A mechanism according to claim 10 wherein said electric motor is adapted to be switched for operation individually with each of eight, four and two pole pairs.

14. A mechanism according to claim 1 wherein said centrifugal friction clutch means comprises a clutch drum, a driving part, including joint means with centrifugal weights being supported in said joint means at said driving part at a distance from an axis of rotation of said driving part in such a manner that they swing radially outwardly due to centrifugal force against the spring force of springs provided to act upon said centrifugal weights, each of said joint means being arranged in the direction of rotation of said motor shaft behind the center of gravity of the centrifugal weight which is held by said joint means.

15. A mechanism according to claim 1 wherein said motor housing flange means comprise flanges mounted on axial end openings of a cylindrical tube forming a part of said motor housing, said cylindrical tube having tongues punched from the wall thereof for fastening the stator laminations of said electric motor, said tongues being bent into the interior of said tube.

16. A mechanism according to claim 15 wherein said tongues are bent into the interior of said tube from the plane of the wall of the tube about a bending line which extends in the circumferential direction of said tube.

17. A mechanism according to claim 1 wherein said one side of said motor shaft is supported in a part which is non-rotatably connected to said hollow shaft.

18. A mechanism according to claim 1 wherein said hollow shaft is supported between said carrier gear of said planetary gearing and said driven member on said gearing housing, said gearing housing being integrally formed with said motor housing flange means.

19. A mechanism according to claim 1 wherein said overrunning clutch means are operatively interposed between said planetary gearing and said hollow shaft to effect driving of driven member by said motor shaft when said motor is operating below a predetermined speed, with engagement of said centrifugal clutch means to effect driving engagement therethrough between said motor shaft and said driven member operating to drive said hollow shaft to cause said overrunning clutch means to disengage.

* * * * *